Sept. 22, 1964　　　　W. H. POWELL　　　　3,150,031
ARTICLE AND METHOD OF MAKING RESILIENT FLOOR
COVERING HAVING AIR POCKETS
Filed July 13, 1960　　　　　　　　　　　　　　2 Sheets-Sheet 1

INVENTOR.
WILLIAM H. POWELL
BY
ATTORNEY

Sept. 22, 1964　　　　W. H. POWELL　　　　3,150,031
ARTICLE AND METHOD OF MAKING RESILIENT FLOOR
COVERING HAVING AIR POCKETS
Filed July 13, 1960　　　　　　　　　　2 Sheets-Sheet 2

INVENTOR.
WILLIAM H. POWELL

BY

ATTORNEY

United States Patent Office 3,150,031
Patented Sept. 22, 1964

3,150,031
ARTICLE AND METHOD OF MAKING RESILIENT
FLOOR COVERING HAVING AIR POCKETS
William H. Powell, Livingston, N.J., assignor to Congo-
leum-Nairn Inc., Kearny, N.J., a corporation of New
York
Filed July 13, 1960, Ser. No. 42,602
12 Claims. (Cl. 161—122)

This invention relates to decorative surface coverings for floors, walls and the like and in particular to plastic surface coverings which have a three-dimensional appearance and to a method of producing such plastic surface coverings.

Plastic surface coverings comprising a resinous binder, stabilizer, filler and colored pigment have come to be widely used as coverings for floors, walls and the like. These products have excellent wearing properties and resistance to attack by household chemicals. These products have been prepared in a wide range of patterns and decorations simulating most of the effects which can be produced with stone flooring materials such as marble and terrazzo. In comparison to stone floorings, they have the advantage of greater resilience which renders them more comfortable under foot. In addition, they do not flake and chip when subjected to sharp impacts which is an undesirable feature of stone floorings.

Soft surface woven and textured carpeting is widely used as a covering for floors and is, therefore, a major source of competition to decorative plastic floor coverings. Although carpeting is soft under foot and has a desirable textured appearance, it does suffer the disadvantage of being difficult to clean. It would be desirable, therefore, to create a three-dimensional effect in a plastic surface covering which would simulate effects heretofore obtainable only in carpeting but which would have a smooth surface which could be easily cleaned. Recently, plastic surface coverings having a translucent appearance have been marketed in an attempt to create such an effect. In the method now in use for producing such plastic surface coverings a batch of translucent plastic composition is formed and blended with separate batches of plastic composition pigmented in each of the colors desired in the finished product. This blend is then pressed or moulded to produce the finished product.

Plastic surface coverings so prepared have a number of significant disadvantages. Although the product appears to be translucent when held in the hand in front of a light, there is little if any three-dimensional effect when the product is installed on the floor. An installation of such products merely resembles a modified form of a marbleized decoration which has been available for many years. Thus, the desired three-dimensional effect is not apparent in such products. The installation of such products requires the use of expensive light colored resinous adhesives. Dark colored adhesives such as linoleum paste which are widely used in installing other types of floor coverings cannot be used. The reason for requiring the expensive light colored adhesives is that in spite of the thickness of the product, there is a possibility that the adhesive might be visible in the finished installation. Any visibility of a dark colored adhesive would mar the appearance of the installation. The production of such products requires preparing a separate batch of pigmented plastic composition in each color desired in the finished product. This involves separate operations of mixing, sheeting and chip formation and requires the maintenance of large inventories of different colored compositions in the manufacturing plant. This large amount of processing required is expensive from the standpoint of labor and also ties up working capital in the large inventories which must be maintained.

As pointed out above, these products do not have a three-dimensional effect. If one attempts to make such a plastic surface covering by using clear transparent composition instead of translucent composition a three-dimensional effect can be obtained. However, the product so produced is unsatisfactory because when it is installed upon a sub-floor, the floor or adhesive is readily visible through the transparent areas of the product. The use of the expensive pigmented adhesives discussed above are not satisfactory to hide the sub-floor. The reason for this is that adhesives must be troweled onto a floor to form a number of closely spaced ridges of adhesive before installing a plastic floor covering. This is necessary for optimum adhesion of the finished product. By troweling the adhesive, it is impossible to insure complete coverage of the floor. It is apparent that the presence of a transparent area in the product immediately over an uncovered or partially covered area of the sub-floor would create an undesirable appearance to the installation.

The use of embossing techniques have also been utilized for producing three-dimensional floor coverings. Such process usually involves the passing of a floor covering through an embossing roll or molding the product against an embossed plate. Very desirable and varied effects can be obtained by this method. The product, however, defeats one of the main purposes of this type of floor covering in that it does not provide a smooth readily cleanable surface. As is apparent, the embossed depressions readily collect dirt and are, therefore, difficult to maintain.

It is an object of the invention to produce a decorative plastic surface covering which can be installed upon a surface such as floors, walls and the like having a three-dimensional appearance. A further object of the invention is to produce a plastic surface covering having a three-dimensional effect with a smooth wearing surface. Another object of the invention is to produce a plastic surface covering having a three-dimensional appearance which can be installed using inexpensive, dark adhesives such as linoleum paste. An additional object of the invention is to provide a plastic surface covering having a three-dimensional effect which can be installed without regard to the character and appearance of the subfloor. A still further object of the invention is to provide a plastic surface covering having a three-dimensional effect in the form of wide sheets permitting installation of the product with a minimum of dirt catching seams. Other objects and the advantages of the invention will appear hereinafter.

In accordance with the invention, a decorative plastic surface covering having a three-dimensional appearance is produced by embossing or otherwise depressing areas of a transparent or translucent plastic film to a substantial depth and thereafter laminating the film to a backing material having a pigmented surface with the embossed side of the film in contact with the backing material. The resulting product has a smooth surface while possessing a three-dimensional appearance created by the appearance of the embossing through the depth of the film. In addition, various designs can be printed on the film or backing material to give the product added variation in design.

The pigmented layer to which the film is laminated is normally formed upon a surface of a sheet of strong backing material. Strength is important in order that the product withstand the strains occurring both during manufacture and installation. In the case of a flexible resilient product useful as a floor covering, the backing should also have sufficient flexibility to permit the product to be rolled and unrolled without cracking or tearing. Suitable backing sheets include those formed of resinous compositions which can eliminate the necessity of applying a pigmented resinous coating to its surface as well as sheets of impregnated felted fibres. Any of the thermoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloridevinyl acetate copolymer and the like can be compounded with plasticizers and fillers and sheeted to form a flexible sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various synthetic fibers. It has been found that felted cellulosic or mineral fibrous sheets impregnated with a water-proofing and/or strengthening impregnant are highly desirable backings for products prepared in accordance with the invention since they are low in cost and yet are flexible and strong. Numerous fibrous materials can be used in preparing a fibrous backing for use in the invention. A slurry of fibrous material in water is formed into a sheet using any of the techniques conventionally employed in the manufacture of paper. For example, sheet formation can take place on a Fourdrinier or cylinder paper machine. The fibrous sheet so prepared is then dried.

As indicated above, felted fibrous sheets for use as backings for surface covering products are normally impregnated with a water-proofing and/or strengthening impregnant in order to impart improved strength and water resistance to the sheet.

The particular impregnant must not only be able to impart strength and water resistance to a sheet of felted fibers but must also have certain desirable high temperature properties to allow them to be subjected to the processing temperatures. It should be free of any volatile components and also it must not soften to such an extent as to exude from the sheet. In addition, the saturant should not be subject to any detrimental chemical changes at these processing temperatures such as oxidation.

Felted fibrous sheets impregnated with asphalt have been used for many years in the production of surface coverings. Asphalt has the desirable features of being low in cost and of imparting good water resistance to a felt sheet. Asphalt, however, is a highly thermoplastic material and tends to become soft at temperatures only slightly above normal in the atmospheric temperatures. Thus, in general, asphalt is a less satisfactory impregnant for felted fibrous backing sheets useful in the invention. Fibrous sheets impregnated with resinous materials are particularly suitable for use as backing sheets in the invention. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, drying oils and the like, isocyanates and polyurethanes and the like are suitable.

Such resins can be incorporated into a felted fibrous sheet by impregnation of the finished sheet with an emulsion or solution of the resin followed by drying of the sheet to remove the solvent. Alternately, the resin can be added in fine particles to the fibre furnish prior to sheet formation either as solid particles of resin or as an emulsion in water from which fine particles of resin are precipitated onto the fibres.

If the backing material is a fibrous sheet, it has to have a pigmented layer applied to its surface. Such a product is illustrated in FIGURE 6. In lieu of this, however, the fibrous sheet can be dyed or otherwise pigmented to form a good background for the film. Such a product is illustrated in FIGURE 7. The pigmented layer can be of any color depending on the particular effect desired in the finished product. It has been found particularly effective from the standpoint of cost and ease of application that the pigmented layer be formed on the backing by coating technique. The coating composition comprises a resinous binder, pigment, filler and stabilizer in a liquid dispersion medium. In the coating composition, the ratio of resinous binder to pigment and filler is usually in the range of about 1:4 to 1.5:1.

The resinous binder used in the coating composition must be one that can be coalesced, fused or cured into a continous film by the application of heat thereby forming the pigmented layer upon the backing. The resinous binder in the coating composition must, in certain instances, be compatible with the embosed film as described more fully hereinafter. The method of the invention is adapted to the preparation of both flexible and rigid decorative sheets, but a flexible product is most desirable for use as a resilient surface covering for floors. The preferred resinous binder in the coating composition comprises thermoplastic resinous material since thermoplastic resins are particularly suited to the production of flexible resilient sheets. The thermoplastic resinous binder can be made up solely of thermoplastic resinous material but it normally comprises a mixture of a thermoplastic resin and plasticizer.

Useful thermoplastic resins include polymers and copolymers of acrylic and methacrylic acids and their derivatives, the vinyl resins, polystyrene, polymerized methylstyrene, polybutadiene and the like. Polymers of vinyl chloride have been found particularly effective in the formulation of coating compositions in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsatured compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, allyl chloride, allyl ethyl ether and the like; and conjugated and cross-conjugated ethylenically unsaturated compounds such as butadiene, isoprene, chloroprene, 2,3-dimethylbutadiene-1,3- piperylene, divinyl ketone and the like.

As already discussed, thermoplastic resinous material can be produced which has satisfactory flexibility at normal temperatures without the presence of plasticizer to be useful as the resinous binder in the coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters and the like.

The coating composition also contains fillers and pigments in accordance with the particular background color desired in the finished product. Inert fillers such as silica, both amorphous and crystalline, whiting, talc, clay, pumice, limestone and the like are suitable. Pigments are selected in accordance with the desired color. For example, where a white background is desired titanium dioxide and zinc oxide either alone or with extenders such as barium sulfate, calcium sulfate, magnesium carbonate, magnesium silicate and the like can be used. For colored background coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, recinoleates, abietates, salicylates and the like. Normally, the composition contains from 0.5 to 5 parts stabilizer per 100 parts resin.

When the coating composition is formulated as an aqueous emulsion, the dispersion is formed in the conventional manner and with conventional ingredients well-known in the latex art. The coating emulsion in general contains about 40 to about 65 percent solids with the balance being water. In addition to the resinous binder, pigment, filler and stabilizer, the emulsion contains conventional wetting agents, thickening agents, antifoam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable antifoam agents are pine oils, silicone antifoam agents such as are manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. The alkali provides a pH of about 7.0 so that there will be no tendency for the latex to coagulate. Calcium hydroxide, ammonia, and potassium hydroxide are suitable alkalies for this purpose.

The coating can be applied from different types of liquid compositions. For example, thermoplastic resinous plastisol and organosol coating systems can be used. In this case, the dispersion medium is a plasticizer for the resinous binder in the case of a plastisol and a mixture of plasticizer and volatile organic solvent in the case of an organosol. Since it is desired to obtain a thin dense layer which completely covers and hides the backing, a dispersion containing high percentages of pigment and filler is particularly desirable. Although coating is preferred, since in this way a thin uniform layer can be applied to the backing at minimum cost, the pigmented layer can also be applied as a thin resinous composition sheet formed by calendering or other techniques of sheet formation. In this case, the pigmented composition sheet can be bonded to the backing by means of a suitable adhesive. Where resinous compositions in sheet form are used as backings, the composition can be pigmented so that the surface upon which the embossed sheet is formed has the desired color. This eliminates the necessity of a separate coating step.

When using the preferred technique of coating to apply a pigmented layer to a surface of the backing, the resinous composition is applied to the backing by any of the conventional techniques well-known in the coating art, such as roller coating, doctor blade coating, spray application, brush application and the like. After the coating has been applied to the backing, the sheet must be subjected to heat in order to evaporate any volatile components and to set the resinous binder into a flexible uniform film. The temperature which the coated layer must attain is dependent on the particular resinous binder used. With the preferred thermoplastic resinous binders, the coating is preferably heated to the fusion temperature of the resin, that is the temperature at which the resin becomes solved by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° to about 375° F. is usually sufficient to yield a uniform film. A similar heat treatment step is carried out when an elastomeric resinous coating composition is applied to a surface of the backing to yield a pigmented layer thereon. Where the thermosetting resinous binders are used in the coating emulsion, the temperature to which the coating is subjected must be sufficient to evaporate all the water in the emulsion but insufficient to completely cure the resin. Heating can be effected by any of the conventionally used methods, such as passing the sheet through a forced hot air oven or radiant heating elements can be placed above the coated surface.

In accordance with the invention, a transparent, partially transparent or translucent film is embossed and then the embossed side of the film laminated to the pigmented layer or sheet or directly to the backing material.

The film comprises a resinous binder and stabilizer and, in addition if the film has opaque areas, filler. Various amounts of pigment can be used to give the film different degrees of translucence. As disclosed above, a resinous binder containing a vinyl chloride polymer is particularly effective in formulating the coating composition used in forming the pigmented layer upon a surface of the backing. Thus, the use of vinyl chloride polymer compositions for the film is particularly effective to insure optimum adhesion between the film and the pigmented layer thereby promoting excellent resistance to delamination. The resulting product is flexible and resilient which renders it highly desirable as a floor covering. Any of the vinyl chloride polymers disclosed above in connection with description of the coating composition can be used in the film compositions, that is homopolymers of vinyl chloride and copolymers thereof. Vinyl chloride polymer compositions contain as the resinous binder a blend of vinyl chloride polymer and plasticizer. Any of the plasticizers disclosed above in the discussion of the coating composition can be used. There normally are from about 15 to about 150 parts plasticizer per 100 parts vinyl chloride polymer.

Although a vinyl chloride polymer binder is particularly effective in the film compositions for use in the invention, these compositions can also be formed from other thermoplastic resins as well as rubbery elastomeric and thermosetting resins, such as disclosed above in the discussion of the coating composition. The resinous system selected for the film should be compatible with the resin in the pigmented layer to insure maximum adhesion between the pigmented layer and the film. In addition, the resin selected should be capable of being formulated into a clear transparent or translucent composition. For example, when the pigmented layer is formed of a thermosetting resinous composition, the film should also be of the thermosetting resinous type, with the particular resin selected being compatible with the composition of the pigmented layer. This compatibility, of course, is not necessary if an adhesive is used for securing the film and backing together.

The film compositions can also contain small amounts of a release additive in order that the product can be more easily removed from the laminating surface. Suitable release additives are waxy substances of both synthetic and natural origin with the vegetable waxes, such as carnauba wax, being particularly effective. Where a release additive is used, the composition normally will contain from 0.2 to 5 parts of release additives per 100 parts resin. The compositions also contain stabilizers to minimize degradation by light and heat, such as disclosed above in the description of the coating composition.

The clear transparent film composition contains resinous binder, stabilizer and a release additive, if desired. Color can be imparted to the clear composition by the use of small amounts of pigment or organic dye, but the amount used must not be sufficient to impart any appreciable degree of opacity to the composition.

The film can be formed by any of the conventional methods of film formation. Normally, the various components of the film are mixed in a suitable mixer such as a Banbury at a temperature which causes the resinous component to become soft thereby forming a homogeneous mixture. This temperature varies with the particular resinous component but is usually between about 250° and about 375° F. The composition is then sheeted by passing through a series of calender rolls. The calender rolls are normally heated at a temperature of from about 25° to about 100° F. below the mixing temperature. The sheet is thereafter cooled and wound on a collecting roll.

Embossing of the film can be carried out with the initial sheet-forming process or at a subsequent stage.

The embossing can be accomplished by any of the conventional methods which usually involve heating the sheet to a temperature at which it is readily deformed (usually from about 225° F. to about 325° F.) and thereafter passing it through an embossing apparatus comprising a steel embossing roll engraved with the desired design to be embossed and a resilient covered back-up roll which forces the sheet against the embossing roll. The film is normally allowed to be carried on the embossing roll which is cold so that the embossings will set in the sheet. The sheet is thereafter further cooled by passing over cooling drums and wound on a collecting drum.

The embossings must be of sufficient depth so that when combined in the final product, they will give the product a three-dimensional appearance. As a general rule, embossing must have a depth of at least 0.003 inch. As normally occurs in embossing operation, the embossed sheet has a thickness greater than the initial sheet.

The thickness of the film itself is not critical to the invention, although it is necessary for the film to have sufficient thickness to give the product a reasonable wear life. A minimum wear thickness for flooring would be at least 0.003 inch and preferably about 0.006 inch. With the minimum wear thickness of 0.003 inch and the minimum embossing depth, the minimum overall thickness of the film would be about 0.006 inch. The embossings can take any design desired depending on the appearance desired in the final product. A particularly effective product is obtained by embossing a pattern in grooves representing a fresnel-type lenticular pattern wherein the grooves are progressive in depth and each ridge has one side perpendicular to the plane of the sheet and the other side at an angle thereto. With an embossed pattern such as this, there is produced a gradient in light reflected from the material. The presence of the air space between the base and the vinyl film is responsible for the desirable effect obtained in the product since the index of refraction of air to vinyl is quite high. These air spaces, of course, must not be of such large area that force exerted on the wear surface of the product will cause the permanent collapse or distortion of the surface of the product.

The embossed film can be laminated to the backing by a variety of methods. It is essential, however, that substantially no heat be applied to the film since any undue heating will result in the loss of fidelity in the embossings. A particularly effective method for carrying out the embossing is by heating the pigmented coating on the base and thereafter passing the heated base with the unheated film between a pair of laminating rolls which comprises a steel roll and a resilient back-up roll. The laminating rolls are maintained as cool as possible and preferably below 120° F. As an alternate method, an adhesive can be applied to the surface of the film and/or the backing material. Such a product is shown in FIGURES 6 and 7. Suitable adhesives are those which are compatible with both the film and the backing. The thermoplastic type of adhesives are preferred since with the solvent type, it is difficult to remove the solvent. Care should be exercised in utilizing the adhesive, however, to prevent the adhesive from filling up the embossed areas or otherwise reducing the fidelity of the embossings in the final product. An adhesive layer of 0.002 inch in thickness has proven particularly effective. The pressure supplied in the laminating step is of particularly critical importance. If the pressure is too great, it will cause the heated base to flow into the embossings thereby destroying or substantially eliminating the desired optical effect. As a general rule, the maximum pressure should not exceed about 35 lbs. per inch of sheet width which is calculated by dividing the total pressure between the laminating rolls by the width of the sheet. The pressure utilized is preferably between about 10 to about 20 lbs. per inch of sheet width.

As mentioned hereinabove, a particularly attractive product is obtained when a multicolored decorative design is printed on the film and/or base. One method of accomplishing this is by the so-called valley printing method wherein a print ink is applied at the same time as the film is embossed. Such printing should, however, be limited to designated areas since it tends to fill up portions of the embossings and cause the product to lose its dimensional appearance. The greatest fidelity of design is obtained by using a transparent film and, therefore, any printing is desirably limited to spaced points in the product.

One embodiment of the invention will be described with reference to the drawings wherein FIGURE 1 is a schematic representation of one method for producing the three-dimensional decorative surface covering of the invention;

FIGURE 5 is a plan view of the product shown in FIGURES 3 and 4;

Figure 1:
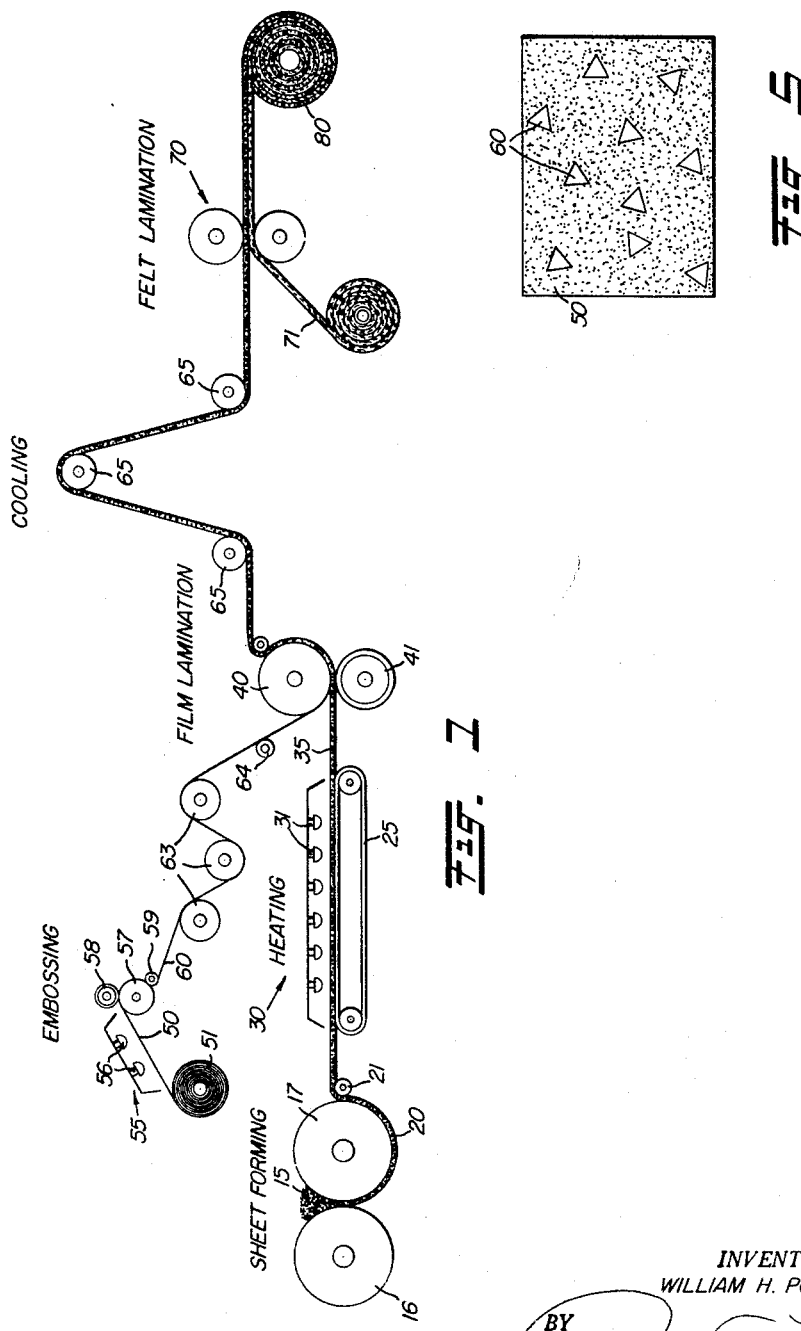
Figure 2:
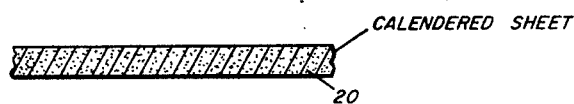
FIGURE 2 is a cross-sectional view of a calendered resinous composition sheet.
Figure 3:
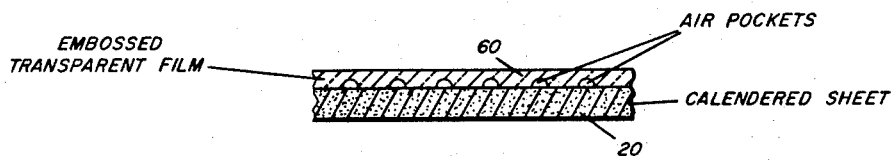
FIGURE 3 is a cross-sectional view of the sheet shown in FIGURE 2 with an embossed transparent film laminated to its surface.
Figure 4:
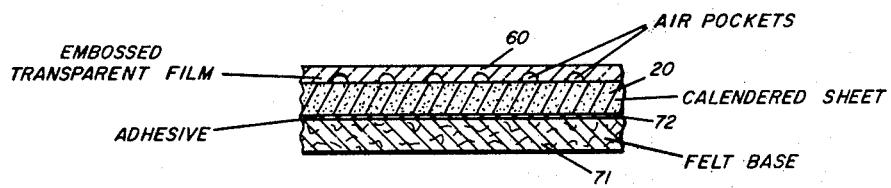
FIGURE 4 is a cross-sectional view of the product shown in FIGURE 3 having a felt sheet adhesively laminated to its back.
Figure 6:
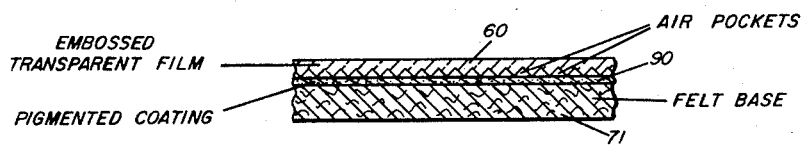
FIGURE 6 is a cross-sectional view of another embodiment of the invention wherein a pigmented coating 90 is applied to the surface of a felt base.
Figure 7:
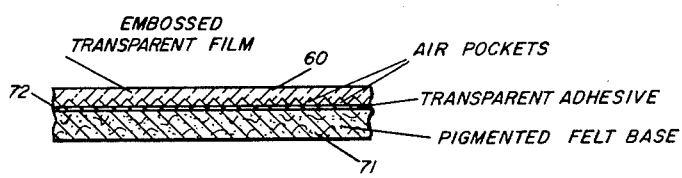
FIGURE 7 is a cross-sectional view of another embodiment of the invention wherein a pigmented felt sheet is adhesively secured to an embossed film.

With reference to FIGURE 1, granules of pigmented plastic composition 15 are fed between calender rolls 16 and 17 which consolidate the granules into sheet 20. The sheet 20 is allowed to follow one of the rolls and is then stripped off the roll by a take-off roll 21. The sheet then passes to a conveyor 25 which conveys the plastic sheet through a heating oven generally indicated at 30 which can have any type of heat source such as a bank of infra-red heating lamps 31. The temperature of the sheet is preferably raised to the highest temperature possible below the decomposition temperature of the composition. When utilizing a polyvinyl chloride resin as the resinous component of the pigmented sheet, a temperature in the range of about 340° to 360° F. has been found particularly effective. When using an adhesive to secure the base to the film, the adhesive can be applied to the surface of the base by any suitable means prior to the heating oven 30. When the adhesive coated sheet passes through the heated oven, it will cause the adhesive to be activated to enable the film to be securely bonded to the backing.

The sheet is then fed to the laminating step. The laminator comprises a steel roll 40 and a steel back-up roll 41 having a resilient cover such as rubber. The film 50 is supplied from supply roll 51 and passes through a heating oven generally indicated at 55 which can be a series of infra-read heat lamps 56 which softens the film to a readily deformable state. The heated film is then passed through an embosser comprising an engraved steel roll 57 and a resilient covered back-up roll 58. The film is allowed to cool in contact with the embossing roll and is then stripped off by take-off roll 59 and further cooled to about room temperature by passing over cooling rolls 63. The embossed film 60 is then placed on top of the heated pigmented sheet and immediately passed through the laminator. The laminating drum 40 is maintained at a temperature as low as possible to prevent any undue heating of the film. The laminated product is allowed to travel on the surface of the drum 40 thereby dissipating as much as possible the heat from the pigmented sheet. The laminated product is then passed over cooling drums 65 after which it is fed to a second laminator generally indicated at 70 where a fibrous backing felt 71 having an activated adhesive 72 on its surface is adhesively bonded to the back of the previous laminated product. The composite product is then wound on a collecting drum 80.

The following examples are given for purposes of illustration:

*Example 1*

A coating emulsion having the following composition was prepared:

| | Parts (dry) |
|---|---|
| Geon 576[1] latex (54% solids) | 42 |
| Titanium dioxide dispersion (60% solids) | 15 |
| Calcium carbonate dispersion (60% solids) | 43 |
| | 100 |

[1] Pre-plasticized polyvinyl chloride copolymer in latex form, B. F. Goodrich Chemical Co., Cleveland, Ohio.

This emulsion was applied by a reverse roller coater to a surface of a sheet of felted cellulose fibers having a thickness of 0.046 inch to form a coating of about 0.005 inch in thickness. The felt was impregnated with a mixture of polyvinyl acetate and a petroleum resin having a softening point of 125° F. The coated felt was dried by exposure to a temperature of 275° F. for five minutes to yield a felt sheet bearing a white pigmented layer upon its surface.

The following composition was mixed and fused in a Banbury mixer at 350° F.:

| | Parts | Percent by weight |
|---|---|---|
| Polyvinyl chloride | 100 | 72.7 |
| Dioctyl phthalate | 33 | 24.0 |
| Barium-cadmium laurate | 2 | 1.5 |
| Epoxyized soya oil | 2 | 1.5 |
| Carnauba wax | 0.4 | .3 |
| | | 100.0 |

The composition while hot was sheeted between calender rolls to yield a clear, transparent sheet of approximately 0.008 inch in thickness. The sheet was then heated to about 325° F. and passed through cold embossing rolls (100° F.) which embossed an overall design in the sheet to a depth of about 0.004 inch. The embossed design is a series of spaced irregularly shaped elements wherein each element resembles a fresnel lens and contains a series of sharply peaked ridges which in cross-section are formed with the sides of the ridges steeper on one side than on the other, and with the grooves varying progressively in depth along the cross-section with respect to the angles at the peaks of the successive ridges and with the slopes of the sides of the ridges with the largest peak angles located at the ridges adjoining the shallowest grooves. The sheet was thereafter cooled to room temperature by passing over cooling cans.

The pigmented coated felt was passed beneath a series of infra-red heat lamps to raise the temperature of the coating to 375° F. The felt was then passed through cold laminating rolls (60° F.). Simultaneously with the passage of the felt through the laminating rolls, the embossed film at room temperature is passed through the rolls with the embossed side of the film contacting the pigmented coating. The laminated product is allowed to remain in contact with one of the laminating rolls to allow the product to cool. The laminate is then further cooled by passing over cooling cans and then wound on a collecting roll.

The film layer of the product is integrally bonded to the pigmented layer with excellent resistance to delamination. The embossed areas of the film have retained their sharp definition. The embossing as viewed through the film gives an appearance of depth to the product.

Example 2

A base sheet having a thickness of 0.015 inch was prepared by mixing the following composition at 350° F. followed by calendering to form a sheet:

| | Parts by weight |
|---|---|
| Copolymer of vinyl chloride and vinyl acetate | 316 |
| Dioctyl phthalate | 126 |
| Asbestos fiber | 140 |
| Wood flour | 30 |
| Dry ground limestone | 100 |
| Silica flour | 215 |
| Stearic acid | 2 |
| Basic lead silicate | 6 |
| Titanium dioxide | 50 |
| Chrome green | 15 |

The sheet was heated to 350° F. to soften the composition and then laminated to an embossed film following the procedure described in Example 1. The laminate product is then fed to a second laminator where an adhesive coated flooring felt (0.046 inch) is laminated to the back of the product. The final product has a three-dimensional appearance caused by the appearance of the embossed area on view through the film.

Example 3

A product was produced following the procedure outlined in Example 2 except that the base sheet was coated with an 0.002 inch thick layer of an adhesive having the following composition:

| | Parts by weight |
|---|---|
| Vinyl chloride and vinyl acetate copolymer having free hydroxyl groups (VAGH manufactured by Union Carbide Chemicals Co., New York, New York) | 3 |
| Tricresyl phosphate | 5 |
| Methylethyl ketone | 8 |

The adhesive coated sheet was then heated to 350° F. to activate the adhesive and the sheet then laminated to an embossed film following the procedure described in Example 1. The product when viewed from the surface has a definite three-dimensional appearance.

Any departure from the above description which conforms to the present invention is intended to be included within the scope of the claims.

What is claimed is:

1. A decorative surface covering having a three-dimensional appearance comprising a pigmented base sheet and a resinous composition film having a thickness of at least 0.006 inch securely bonded to one surface of said base, said film having an embossed design extending to a depth of at least 0.003 inch in the surface of the film contacting said base and being sufficiently transparent to have substantial portions of said embossed design and said pigmented base visible through the opposite surface of said film, the areas between the said one surface of the base and said embossed design in the film forming air pockets.

2. A decorative surface covering having a three-dimensional appearance comprising a colored fibrous felted base sheet and a resinous composition film having a thickness of at least 0.006 inch securely bonded to one surface of said base sheet, said film having an embossed design extending to a depth of at least 0.003 inch in the surface of the film contacting said base and being sufficiently transparent to have substantial portions of said embossed design and said colored base visible through the opposite surface of said film, the areas between the said one surface of the base and said embossed design in the film forming air pockets.

3. A decorative surface covering having a three-dimensional appearance comprising a cellulosic felted fibrous base sheet, a thin pigmented coating of vinyl composition covering one surface of said base sheet and securely bonded thereto and a transparent vinyl composition film having a thickness of at least 0.006 inch secured to said pigmented coating, said film having an embossed design extending to a depth of at least 0.003 inch in the surface of the film contacting said pigmented base and being sufficiently transparent to have substantial portions of said embossed design and said pigmented coating visible through the opposite surface of said film, the areas between the said one surface of the base and said embossed design in the film forming air pockets.

4. A decorative surface covering having a three-dimensional appearance comprising a cellulosic felted fibrous base sheet, a pigmented vinyl chloride composition coating completely covering the surface of said base and securely bonded thereto and a vinyl chloride composition film having a thickness of at least 0.006 inch secured to said pigmented coating, said film having an embossed design extending to a depth of at least 0.003 inch in the surface of the film contacting said pigmented base and being sufficiently transparent to have substantial portions of said embossed design and said pigmented coating visible through the opposite surface of said film, the areas between the said one surface of the base and said embossed design in the film forming air pockets.

5. A decorative surface covering having a three-dimensional appearance which comprises a pigmented base sheet and a vinyl chloride resinous composition film having a thickness of at least 0.006 inch securely bonded to one surface of said base, said film having an embossed design extending to a depth of at least 0.003 inch in the surface of the film contacting said base comprising a multiplicity of design areas arranged in continuous relation, at least some of said design areas having a plurality of altering ridges and grooves, whose profiles taken along a section at right angles to the surface of the film are formed of substantially straight lines, each of said ridges having one steep side and one more gently sloping side, the profiles of the steep sides of all the ridges being parallel and the profiles of the gently sloping sides varying progressively as to slope along said section, the depths of said grooves and the angles at the peaks of the successive ridges varying concomitantly and progressively along said sections, the largest peak angles and the gentlest slopes being located at the ridges adjoining the shallowest grooves, said film being sufficiently transparent to have substantial portions of said embossed design and said pigmented base visible through the opposite surface of said film, the areas between the said one surface of the base and said embossed design in the film forming air pockets.

6. A method for producing a decorative surface covering having a three-dimensional appearance which comprises forming a transparent film having a thickness of at least 0.006 inch from a resinous composition mass, embossing a design into one surface of said film to a depth of at least 0.003 inch to produce a film having a substantial portion of said surface unembossed, applying to a backing material a pigmented resinous coating composition and laminating said coated base to the embossed surface of said film without substantially distorting said embossed design by maintaining the temperature of the embossed film below about 120° F. thereby producing said surface covering having the areas between the surface of the coated base and said embossed design forming air pockets.

7. A method for producing a decorative surface covering having a three-dimensional appearance which comprises coating a fibrous felt sheet on one surface with pigmented resinous composition having a thickness of at least 0.006 inch, heating the resinous composition to soften the composition, embossing a design into one surface of a resinous composition film to a depth of at least 0.003 inch to produce a film having a substantial portion of said surface unembossed, laminating said embossed surface of said film to said heat-softened pigmented coating without raising the temperature of said film above about 120° F. and without altering said embossed design thereby producing said surface covering having the areas between the surface of the coated base and said embossed design forming air pockets, and thereafter cooling said laminate.

8. A method for producing a decorative surface covering having a three-dimensional appearance which comprises forming a transparent film having a thickness of at least 0.006 inch from a vinyl resinous composition mass, embossing a design into one surface of said film to a depth of at least 0.003 inch to produce a film having a substantial portion of said surface unembossed, applying to a backing material a pigmented vinyl resinous coating composition and laminating said coated base to the embossed surface of said film without substantially distorting said embossed design by maintaining the temperature of the embossed film below about 120° F. thereby producing said surface covering having the areas between the surface of the coated base and said embossed design forming air pockets.

9. A method for producing a decorative surface covering having a three-dimensional appearance which comprises forming a homogeneous composition of vinyl resin, plasticizer and filler into a sheet by heating to the fusion temperature of the composition, heating said sheet to soften the surface thereof, embossing a design to a depth at least 0.003 inch into one surface of a transparent vinyl resinous composition film having a thickness of at least 0.006 inch, laminating the embossed surface of said film to said heated sheet without substantially altering said embossed design by maintaining the temperature of the embossed film below about 120° F. thereby producing said surface covering having the areas between the surface of said sheet and said embossed design forming air pockets and immediately reducing the temperature of the laminated product.

10. A method for producing a decorative surface covering having a three-dimensional appearance which comprises heating the surface of a pigmented vinyl chloride composition base to soften the composition, embossing a design into one surface of a transparent vinyl chloride composition film having a thickness of at least 0.006 inch to a depth of at least 0.003 inch, cooling the embossed surface of said film to less than 120° F., passing said cooled film and said heated base with the embossed surface of said film in contact with said base between laminating rolls maintained at a temperature of less than 120° F. thereby laminating said film and base together without substantially distorting said embossed design and producing said surface covering having the areas between the surface of the base and said embossed design forming air pockets, and thereafter cooling the laminated product.

11. The process of claim 10 wherein the pressure exerted on said film by said laminating rolls is less than 35 pounds per inch of sheet width.

12. A method for producing a decorative surface covering having a three-dimensional appearance which comprises embossing one surface of a transparent film of resinous composition having a thickness of at least 0.006 inch with a design extending into said one surface for a depth of at least 0.003 inch to produce a film having a substantial portion of said one surface unembossed and laminating the embossed surface of said film to one surface of a pigmented resinous composition sheet without distorting said embossed design by maintaining the temperature of the embossed film below about 120° F. thereby producing said surface covering having the areas between the one surface of said base and said embossed design forming air pockets.

References Cited in the file of this patent
UNITED STATES PATENTS

| | | |
|---|---|---|
| 1,611,330 | Bird | Dec. 21, 1926 |
| 2,180,002 | Ford | Nov. 14, 1939 |
| 2,392,594 | Karfiol et al. | Jan. 8, 1946 |
| 2,397,856 | Hagerty | Apr. 2, 1946 |
| 2,404,073 | Karfiol et al. | July 16, 1946 |
| 2,617,750 | Le Clair et al. | Nov. 11, 1952 |
| 2,961,029 | Rainar | Nov. 22, 1960 |
| 3,000,754 | Zentmyer | Sept. 19, 1961 |
| 3,056,224 | Almy et al. | Oct. 2, 1962 |